Sept. 27, 1955　　　　W. S. ALLEN　　　　2,719,075
PURIFICATION OF ALKALI METAL SULFITE LIQUORS
Filed Jan. 21, 1952
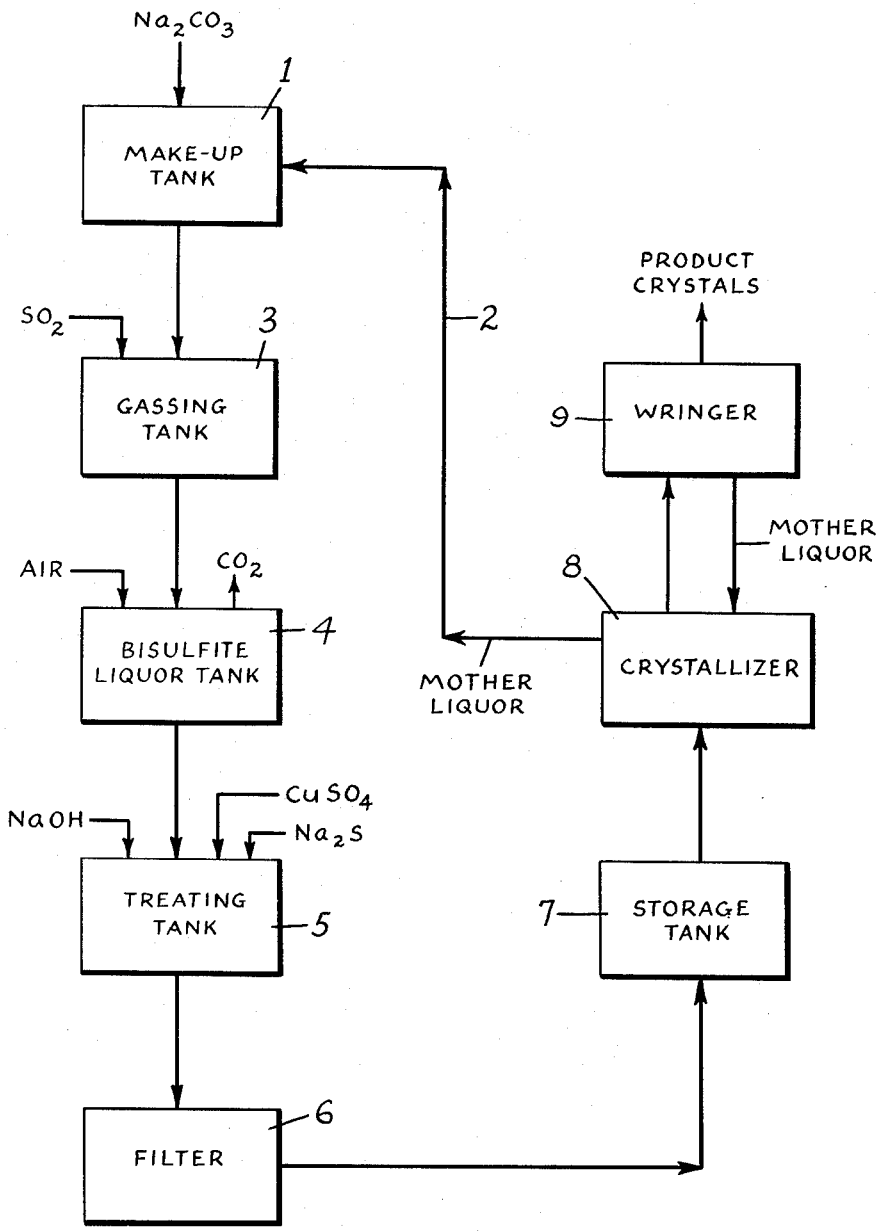
INVENTOR.
WALTER S. ALLEN
BY Ernest A. Polin
ATTORNEY.

United States Patent Office 2,719,075
Patented Sept. 27, 1955

2,719,075

PURIFICATION OF ALKALI METAL SULFITE LIQUORS

Walter S. Allen, Flushing, N. Y., assignor to Allied Chemical & Dye Corporation, New York, N. Y., a corporation of New York Application January 21, 1952, Serial No. 267,475

7 Claims. (Cl. 23—129)

This invention relates to the manufacture of alkali metal sulfites, particularly sodium sulfite. Generally, the invention is directed to a process for purifying alkali metal sulfite liquors, and more particularly to a process for the purification of such liquors so as to facilitate the production of sodium sulfite of a high degree of purity.

The principal object of the invention resides in the provision of a process for making an anhydrous alkali metal sulfite, the resulting product of which gives a solution in water having improved clarity and containing substantially no insoluble matter.

Considerable research work has been done in an effort to develop a process for making an alkali metal sulfite, the product of which would give a clear solution in water. In many of the arts, it is highly desirable, if not entirely essential, to utilize an alkali metal sulfite water solution which is perfectly clear. For example, in the specifications for photographic grade sodium sulfite crystals, a 25% solution in water must not develop, upon standing, even a trace of turbidity or formation of deposit.

In the past, it has been believed that the turbidity of water solutions of alkali metal sulfites has been caused by the presence of small amounts of metal salt impurities, such as of iron and lead, in the alkali metal sulfite liquors. The procedure employed for removing these impurities from alkali metal sulfite liquors has been essentially that of Butler Patent 1,937,944 of December 5, 1933, in which a water-soluble sulfide such as sodium sulfide is added to the sulfite liquor to precipitate the impurities. Alkali metal sulfites, even when purified by the Butler process, often produce aqueous solutions which do not pass rigid turbidity specifications such as those set up by the photographic industry. I believe that one of the main causes of the turbidity of these solutions is the presence of calcium sulfite derived from calcium-containing impurities of water, source chemicals, or both.

I have now found that an alkali metal sulfite can be produced which gives a solution of sufficiently high clarity when dissolved in water so as to be utilizable for any desired purpose. Broadly stated, I accomplish this result by incorporating in the alkali metal sulfite liquor a copper compound which produces copper ions therein, conveniently a water-soluble copper salt, and then treating the liquor with a water-soluble sulfide.

While I do not intend to be bound by any theory, it appears that the effectiveness of the treatment of the sulfite liquor with the copper compound and water-soluble sulfide may be explained on the basis that copper sulfide coprecipitates with iron sulfide (and sulfides of other metal impurities) and the sulfides act, in turn, upon the calcium sulfite (originally present in colloidal form) to precipitate the same.

The accompanying flow sheet diagrammatically illustrates one application of the process of my invention. It will be understood that the separate units of the apparatus employed in carrying out my process are of conventional and well-known design, and include the usual accessories such as pumps, agitators in the tanks, etc.

Mother liquor from which sodium sulfite crystals have been separated is fed through line 2 into a make-up tank 1 supplied with an agitator (not shown). Dry soda ash ($Na_2CO_3$) is added to the agitated mother liquor at a temperature ranging from about 90° to 100° F. until the batch tests about 28.0° to 29.5° Bé. at the aforementioned temperature.

The resulting reaction mixture is next passed into a gassing tank 3 where $SO_2$ gas is introduced until the mixture attains such an acidity that a 10 cc. sample requires about 7 cc.–10 cc. of N/1 NaOH to bring the sample back to neutral to thymolphthalein indicator. The mass collecting in tank 3 is a liquor comprising sodium bisulfite and a lesser amount of sodium sulfite. From the gassing tank the bisulfite liquor is discharged into a bisulfite liquor tank 4 where air is introduced to remove practically all the $CO_2$ present.

The bisulfite liquor is then led into a treating tank 5 where copper sulfate is added in desired amount. Since an excessive amount of copper sulfate may lead to operational difficulties, generally not over about 0.1% copper sulfate (0.04% Cu) by weight of the bisulfite liquor is used. The copper sulfate may conveniently be added to the bisulfite liquor as a solid, or, if desired, in solution. Caustic soda (NaOH), preferably at a concentration of about 40%, is then added to the bisulfite liquor until it attains a pH of at least 7.0, the bisulfite being thereby converted to sulfite. At this point the batch is adjusted, if necessary, to test about 30.0° to 31.0° Bé. at about 95° F. The sulfite liquor is then treated with sodium sulfide as shown in Butler Patent 1,937,944 of December 5, 1933.

Although the above description refers to the addition of copper sulfate, caustic soda and sodium sulfide in that order, the caustic soda may be added prior to the copper sulfate with equal success. Furthermore, if desired, the copper sulfate may satisfactorily be added at an earlier stage in the process.

After treatment in treating tank 5, the resulting sulfite liquor containing precipitated impurities is conducted through a filter 6 into a storage tank 7. From tank 7 the sulfite liquor is fed to a crystallizer 8. A slurry of product crystals in mother liquor is discharged from the crystallizer to a wringer 9, wherein the crystals are separated and mother liquor is returned to the crystallizer. The resulting anhydrous sodium sulfite produced from the separated crystals is snow-white in appearance, gives a perfectly clear solution in water and contains substantially no insoluble matter. Mother liquor from the crystallizer is then fed into make-up tank 1 through line 2 where soda ash is added for the next cycle.

If required or desired, fresh water may be introduced into the system at appropriate points (not shown).

Although the above description refers particularly to the use of sodium sulfite, copper sulfate and sodium sulfide, it is not limited to these particular compounds as other alkali metal sulfites such as potassium sulfite; other copper compounds which produce copper ions in the liquor to be treated such as copper chloride or copper nitrate; and other water-soluble sulfides such as potassium sulfide or hydrogen sulfide may be used, as will be apparent to those skilled in the art.

For most efficient operation, as indicated above, the amount of copper added as copper compound should not exceed about 0.04% by weight of the liquor to be treated, and I preferably use about 0.004% to 0.008% copper.

The quantity of water-soluble sulfide added depends upon the amount of impurities, including copper compound, present in any specific batch of liquor to be treated. Any quantity of the water-soluble sulfide up to the theoretical amount will effect an improvement in product, and a good product may be secured when a theoretical quantity of sulfide is utilized. Particularly good results have been secured where a slight excess (e. g. about 5%) over the theoretical amount of sulfide was used.

The beneficial results of my invention are obtained only when the liquor to be treated has a pH of at least 7.0 prior to addition of the water-soluble sulfide. Adjustment of the liquor to a pH of about 8.6 to 9.8 has been found to be particularly advantageous.

In order to further illustrate the invention, the following examples are given which should not be construed as limiting the same in any manner whatsoever.

In a series of tests, plant made approximately 28° Bé. sodium sulfite liquors were treated for removal of impurities. In all cases, an amount of sodium sulfide was used in slight excess of that required for precipitation as determined with silver nitrate solution on an external spot plate. Solutions stood for one hour at 90° F., were filtered, and percent light transmission (designated as L. T.) was determined by a Fisher electrophotometer.

*Table*

| | pH of Sulfite Liquor | L. T. Liquor After Removal of Precipitated Impurities ("as is") | L. T. First Batch Crystals (25% solution in water) | L. T. Liquor After Removal of first crystals ("as is") | L. T. Second Batch Crystals (25% solution in water) |
|---|---|---|---|---|---|
| 1. Sodium sulfide alone added | 8.6 | 29.0 | 85.5 | 96.5 | |
| 2. Sodium sulfide alone added | 8.6 | 30.9 | 68.0 | 96.5 | |
| 3. Added .02% copper sulfate on wgt. of liquor before sulfide addition | 8.6 | 97.3 | 95.1 | 98.0 | |
| 4. Added .02% copper sulfate on wgt. of liquor before sulfide addition | 8.6 | 96.4 | 99.0 | 97.5 | 99.0 |
| 5. Added .02% copper sulfate on wgt. of liquor before sulfide addition | 9.2 | 96.0 | 97.1 | 97.1 | 98.5 |
| 6. Added .02% copper sulfate on wgt. of liquor before sulfide addition | 9.8 | 96.0 | 97.7 | 96.4 | 99.0 |

From the above data it is apparent that the addition of copper sulfate together with sodium sulfide enabled production of sodium sulfite solutions having considerably higher L. T. values than in those cases where sodium sulfide alone was used.

In actual plant tests, approximately 30° Bé. sodium sulfite liquor, neutralized to thymol blue indicator (ph 8.6–9.0), was treated with 0.01% $CuSO_4$ (0.004% Cu), liquor basis, followed by 10% $Na_2S$ to slight excess, as shown by the $AgNO_3$ spot test. The mixture was agitated for several minutes, filtered and the liquor heated to remove crystal crop. The resulting mother liquor was then brought up to strength with more soda ash and $SO_2$ gas and the purification procedure repeated to give further crystal crops. Light transmission of 25% solutions of the product crystals ranged from 96.0% to 98.5%.

I claim:

1. The process of purifying an alkali metal sulfite liquor containing calcium sulfite and other turbidity-producing impurities which comprises incorporating in the liquor not more than about 0.04% by weight copper (based on the sulfite liquor) as a water-soluble copper salt, then treating the liquor at a pH of at least 7.0 with a water-soluble sulfide to precipitate said impurities, and then separating the precipitate from the liquor.

2. The process of purifying an alkali metal sulfite liquor containing calcium sulfite and other turbidity-producing impurities which comprises incorporating in the liquor not more than about 0.04% by weight copper (based on the sulfite liquor) as copper sulfate, then treating the liquor at a pH of at least 7.0 with sodium sulfide to precipitate said impurities, and then separating the precipitate from the liquor.

3. The process of purifying an alkali metal sulfite liquor containing calcium sulfite and other impurities forming insoluble precipitates which comprises incorporating in the liquor not more than about 0.04% by weight copper (based on the sulfite liquor) as a water-soluble copper salt, then treating the liquor at a pH of at least 7.0 with a water-soluble sulfide in an amount at least equal to a chemical equivalent of the contained impurities, including the water-soluble copper salt, to precipitate said impurities, and then separating the precipitate from the liquor.

4. The process of purifying sodium sulfite liquor containing calcium sulfite and other impurities forming insoluble precipitates which comprises incorporating in the liquor not more than about 0.04% by weight copper (based on the sulfite liquor) as a water-soluble copper salt, then treating the liquor at a pH of at least 7.0 with a water-soluble sulfide in an amount at least equal to a chemical equivalent of the contained impurities, including the water-soluble copper salt, to precipitate said impurities, and then separating the precipitate from the liquor.

5. The process of purifying sodium sulfite liquor containing calcium sulfite and other impurities forming insoluble precipitates which comprises incorporating in the liquor about 0.004% to 0.008% by weight copper (based on the sulfite liquor) as copper sulfate, then treating the liquor at a pH of about 8.6 to 9.8 with sodium sulfide in an amount in slight excess of a chemical equivalent of the contained impurities, including the copper sulfate, to precipitate said impurities, and then separating the precipitate from the liquor.

6. The process of purifying an alkali metal sulfite liquor containing calcium sulfite and other impurities forming insoluble precipitates which comprises incorporating in the liquor about 0.004% to 0.008% by weight copper (based on the sulfite liquor) as a water-soluble copper salt, then treating the liquor at a pH of about 8.6 to 9.8 with a water-soluble sulfide in an amount in slight excess of a chemical equivalent of the contained impurities, including the water-soluble copper salt, to precipitate said impurities, and then separating the precipitate from the liquor.

7. The process of purifying sodium sulfite liquor containing calcium sulfite and other impurities forming insoluble precipitates which comprises incorporating in the liquor about 0.004% to 0.008% by weight copper (based on the sulfite liquor) as a water-soluble copper salt, treating the liquor at a pH of about 8.6 to 9.8 with a water-soluble sulfide in an amount in slight excess of a chemical equivalent of the contained impurities, including the water-soluble copper salt, to precipitate said impurities, and then separating the precipitate from the liquor.

References Cited in the file of this patent

UNITED STATES PATENTS

| 1,937,944 | Butler | Dec. 5, 1933 |

FOREIGN PATENTS

| 884,791 | France | May 8, 1943 |